United States Patent
Wirachowski et al.

(10) Patent No.: US 9,638,283 B2
(45) Date of Patent: May 2, 2017

(54) TORSIONAL VIBRATION DAMPER

(71) Applicant: ZF FRIEDRICHSHAFEN AG, Friedrichshafen (DE)

(72) Inventors: Michael Wirachowski, Wurzburg (DE); Matthias Kram, Volkach (DE); Ying Dong, Bergrheinfeld (DE); Volker Stampf, Schweinfurt (DE); Jörg Sudau, Niederwerrn (DE); Armin Stürmer, Rannungen (DE); Friedrich Kokott, Bergrheinfeld (DE); Christoph Sasse, Schweinfurt (DE); Daniel Pittner, Gerbrunn (DE); Oliver Andres, Bamberg (DE); Simone Vierneusel, Konigsberg-Holzhausen (DE); Dennis Egler, Espenau (DE); Kyrill Siemens, Wurzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/439,186

(22) PCT Filed: Sep. 30, 2013

(86) PCT No.: PCT/EP2013/070305
§ 371 (c)(1),
(2) Date: Apr. 28, 2015

(87) PCT Pub. No.: WO2014/067727
PCT Pub. Date: May 8, 2014

(65) Prior Publication Data
US 2015/0316124 A1 Nov. 5, 2015

(30) Foreign Application Priority Data

Oct. 29, 2012 (DE) .................. 10 2012 219 738

(51) Int. Cl.
*F16F 15/14* (2006.01)
*F16F 15/131* (2006.01)

(52) U.S. Cl.
CPC ...... *F16F 15/145* (2013.01); *F16F 15/13128* (2013.01); *Y10T 74/2128* (2015.01)

(58) Field of Classification Search
CPC .............. F16F 15/145; F16F 15/13128; Y10T 74/2128
(Continued)

(56) References Cited

U.S. PATENT DOCUMENTS 8,146,457 B2 * 4/2012 Wright .................. F16F 15/145
74/572.2
2015/0101450 A1 * 4/2015 Kuhnle ................. F16F 15/145
74/574.2

(Continued)

FOREIGN PATENT DOCUMENTS

DE 10 2009 042 818 5/2010
DE 10 2009 042 804 6/2010

(Continued)

Primary Examiner — Gregory Binda
(74) Attorney, Agent, or Firm — Cozen O'Connor

(57) ABSTRACT

A torsional vibration damper is provided with a damper mass carrier at which is received at least one damper mass that is movable relative to the damper mass carrier and at least one stop. The at least one stop is associated with each stop side of the at least one damper mass. The at least one damper mass and the stop have an extension in extension direction of a central axis. The at least one damper mass has a plurality of damper mass elements in extension direction of the central axis, while the stop has in extension direction of the central axis a stop profile at its side facing the stop sides of the damper mass elements. The stop profile has different radial distances from the central axis in association with the damper mass elements.

21 Claims, 14 Drawing Sheets

(58) Field of Classification Search
USPC .............. 464/3, 68.2; 192/3.29, 3.31, 201; 74/574.2
See application file for complete search history.

(56) References Cited

U.S. PATENT DOCUMENTS

2015/0285332 A1* 10/2015 Kram .................... F16F 15/145
74/574.2
2016/0208887 A1* 7/2016 Kram .................... F16F 15/145

FOREIGN PATENT DOCUMENTS

| DE | 10 2010 049 930 | 5/2011 |
| DE | 10 2012 214 214 | 3/2013 |
| WO | WO 2013/079 042 | 6/2013 |

\* cited by examiner

X

TORSIONAL VIBRATION DAMPER

CROSS REFERENCE TO RELATED APPLICATIONS

This is a U.S. national stage of application No. PCT/EP2013/070305, filed on Sep. 30, 2013. Priority is claimed on German Application No.: DE102012219738.9, filed Oct. 29, 2012, the content of which is incorporated herein by reference.

BACKGROUND OF THE INVENTION

1. Field of the Invention

The present invention is directed to a torsional vibration damper that has a damper mass carrier having at least one damper mass movably received relative to the damper mass carrier and at least one stop. At least one stop is associated with each stop side of the at least one damper mass, and the at least one damper mass and the stop have an extension in direction of a central axis.

2. Detailed Description of Prior Art

A torsional vibration damper is known from DE 10 2009 042 818 A1. According to FIG. 1, this torsional vibration damper has, in a radially inner region, an annular component part secured to an output-side flywheel mass of the torsional vibration damper and receives a hub disk with play in circumferential direction, this hub disk serving as damper mass carrier. As is shown in particular in FIG. 4, the hub disk receives a plurality of damper masses arranged consecutively in circumferential direction and, to this end, has two guideways for each damper mass, these two guideways are connected to two guideways of the respective damper mass via a rolling body. In this way, the damper masses are displaceable in circumferential direction relative to the hub disk until engaging by radial extensions at a flexible stop associated with the respective movement direction. According to the construction in FIG. 1, the flexible stop is provided at the annular component part.

While the damper masses operate sufficiently noiselessly in driving mode, the speed operative at the hub disk and, therefore, the centrifugal force acting on the damper masses drops rapidly in stop phases of the drive, e.g., internal combustion engine, or in vehicle creep mode. As soon as the centrifugal force has dropped below the weight force, the damper masses drop down and generate an undesirable impact noise in their tracks and/or at the stops.

SUMMARY OF THE INVENTION

It is an object of one embodiment of the invention to construct a torsional vibration damper provided with damper masses such that impact noise can be efficiently prevented even in operating phases in which the centrifugal force acting on the damper masses falls below the weight force.

According to a key aspect of the present invention, a torsional vibration damper has a damper mass carrier at which is received at least one damper mass received so as to be movable relative to the damper mass carrier and at least one stop, and at least one stop is associated with each stop side of the at least one damper mass, and the at least one damper mass and the stop have an extension in extension direction of a central axis.

It is then further provided according to one embodiment of the invention that the at least one damper mass has a plurality of damper mass elements in direction of the central axis, while the stop has a stop profile at its side facing the stop sides of the damper mass elements, which stop profile provides different radial distances between the respective stop side of the damper mass elements and the stop in extension direction of the central axis for at least two damper mass elements.

By the stop profile provided at the stop, the stop sides of the individual damper mass elements are arranged at different drop heights F1 to F3 relative to the stop profile in an operating condition in which the centrifugal force exceeds the weight force. When entering an operating condition in which the centrifugal force falls below the weight force, these different drop heights F1 to F3 act in the following manner:

The damper mass element having the stop side with the shortest drop height F1 relative to the stop profile is the first damper mass element to engage the stop, while the further damper mass elements strike the stop consecutively and, therefore, in a temporally offset manner. Since the individual damper mass element has only a fraction of the weight of the entire damper mass, the impact on the stop takes place with less noise than would be the case for the entire damper mass. Since the individual damper mass elements strike the stop in a temporally consecutive manner because of the above-mentioned arrangement of radial distance, there is also no overlapping of the noise of the individual damper mass elements. Further, adaptation of the geometric configuration of the stop sides of the damper mass elements to the geometric configuration of the stop profile of the stop can contribute to reducing noise.

The stop profile is preferably configured to slope in extension direction of the central axis. This results in a situation where the stop profile of the stop at a first axial side A1 of the damper mass has a radial distance from the central axis to attain its maximum extension at a second axial side A2 of the damper mass. Consequently, there results axially between the two axial sides A1 and A2 a radial distance from the central axis, which radial distance is greater than the radial distance at axial side A 1 but less than the radial distance at axial side A2. The above-mentioned slope can follow an at least substantially continuous course and, in a particularly preferable manner, the stop profile at least substantially narrows in a wedge shape in this direction, but can also follow an at least substantially discontinuous course in that it extends in a stepped manner in this direction.

The stops for the damper masses are preferably secured in circumferential direction between every two damper masses. To this end, the stops have stop receivers. In a first case, these stop receivers can be received at a fastening location, for example, at a damper mass carrier, and can be at least substantially pin-shaped; but in a second case the stop receivers can be formed by studs that are secured to the stop and engage in corresponding receptacles of the fastening location, for example, at the damper mass carrier. In the first case, the fastening location, for example, the damper mass carrier, can be configured with two damper mass support elements, which extend parallel to one another, and are held at a fixed distance from one another by spacers, these spacers extending through a holder at the stop in each instance. In the second case, however, the respective holder at the stop is provided for receiving the stud intended to engage in a receptacle at the fastening location.

Alternatively, however, the stop receivers can be formed by holding projections which, in each instance, extend through an associated recess or engage therein so as to clip the stop to a fastening location in this way. Component parts of a coupling arrangement, for example, an element of a damping device or of a hydrodynamic circuit, are advantageous as fastening location.

As a further alternative, the stops can be floatingly received with respect to the stop receivers and are therefore movable relative to the stop receivers. When the stops are floatingly received, particularly when they are provided at an annular component part, they can have increased resiliency and, therefore, improved damping characteristics. This can have advantageous results when the damper mass elements engage by their stop sides.

By way of supplementing the stop receivers, the stops can be radially supported at a component part of the coupling arrangement at an element of the hydrodynamic circuit.

When the spacers extend through the respective holder at the stop, this can be carried out with an axial offset between the axis of the respective spacer and the axis of the respective holder. Owing to this axial offset, a free space results between the holder and the respective spacer. This free space promotes an elasticity at the stop in that the wall of the holder impinged by a damper mass can extend elastically into this free space. A solution of this kind is attractive when the radial stops for a plurality of damper masses are collectively arranged on a common, preferably annular, component part that extends radially inwardly of the damper masses and when the axial offset is so configured that the respective free spaces occur in the radially outer regions of the holders. The annular component part is then centered via the radially inner regions of the holders.

BRIEF DESCRIPTION OF THE DRAWINGS

The invention will be described more fully in the following with reference to the accompanying drawings. The drawings show:

FIG. 7 is the stop according to FIG. 3 in an isometric view with holders for stop receivers to pass through;

FIG. 8 is a view similar to FIG. 7, but with holders to which stop receivers are secured;

DETAILED DESCRIPTION OF THE PRESENTLY PREFERRED EMBODIMENTS

Figure 1:
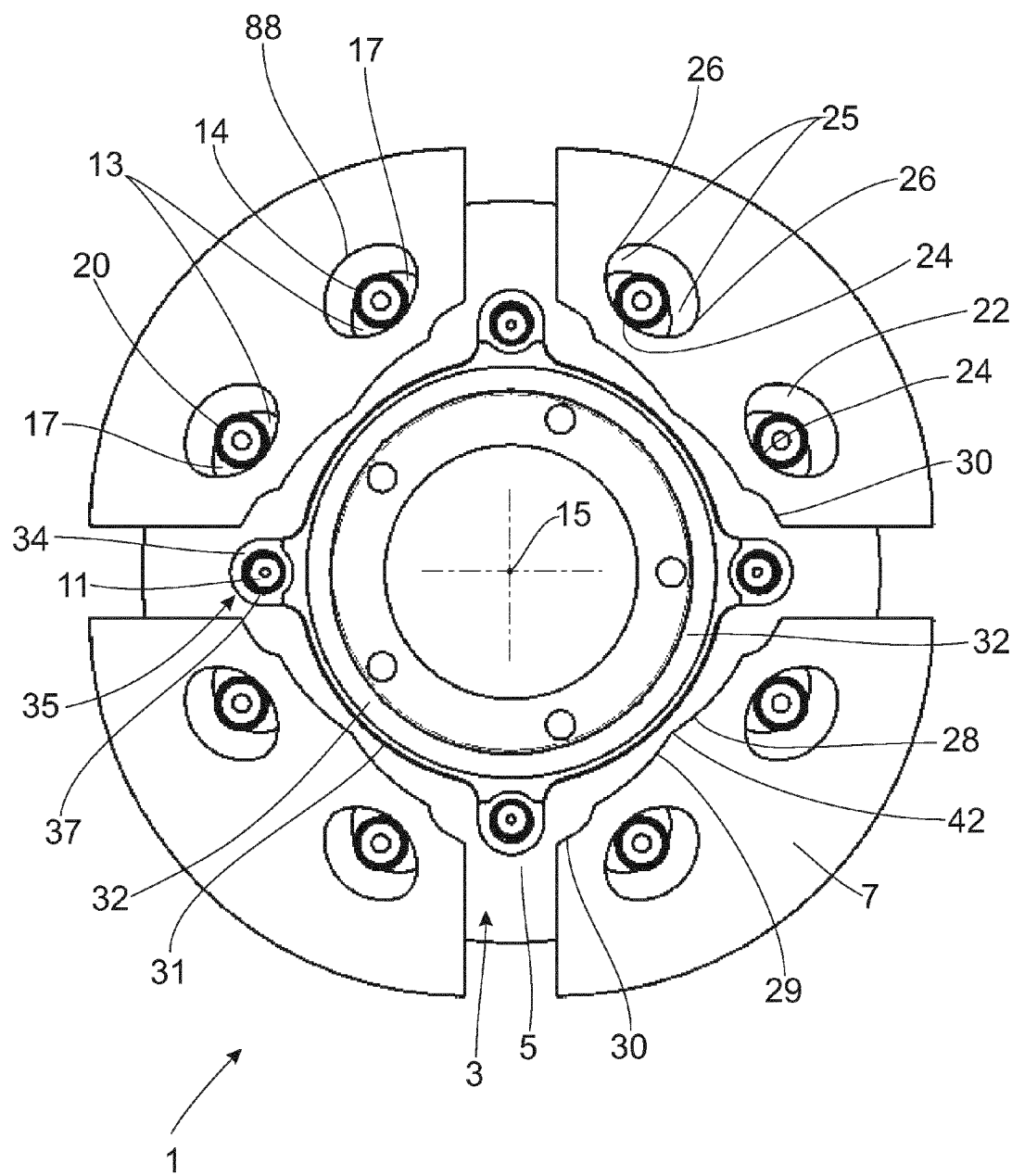
FIG. 1 is a top view of a torsional vibration damper with damper masses and associated stop, wherein the damper masses occupy a position which is reached when centrifugal force exceeds the force of gravity, but without transmitted torsional vibration.
Figure 5:
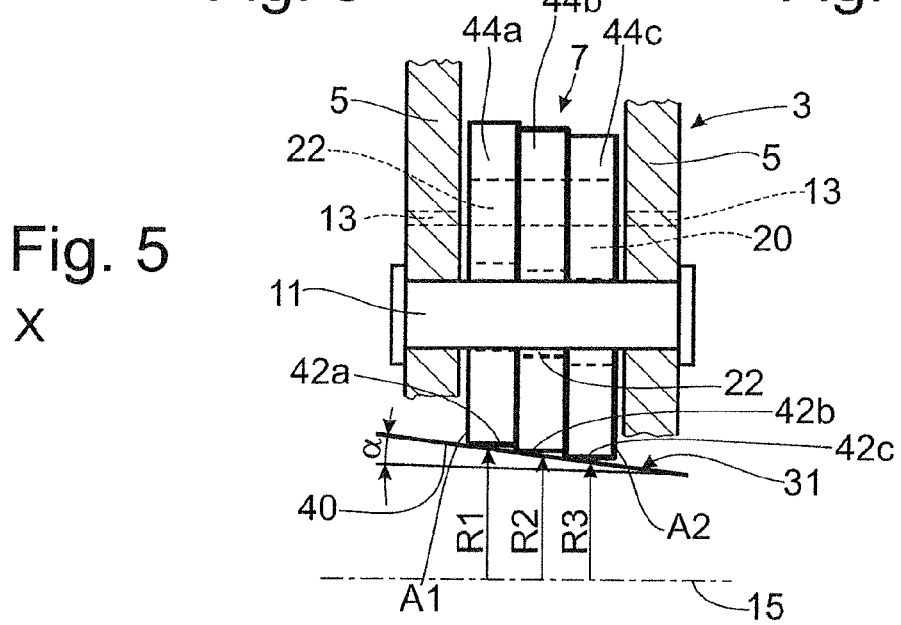
FIG. 5 is a greatly enlarged detail of the stop profile shown in FIG. 4 for a plurality of damper mass elements of a damper mass.
Figure 10:
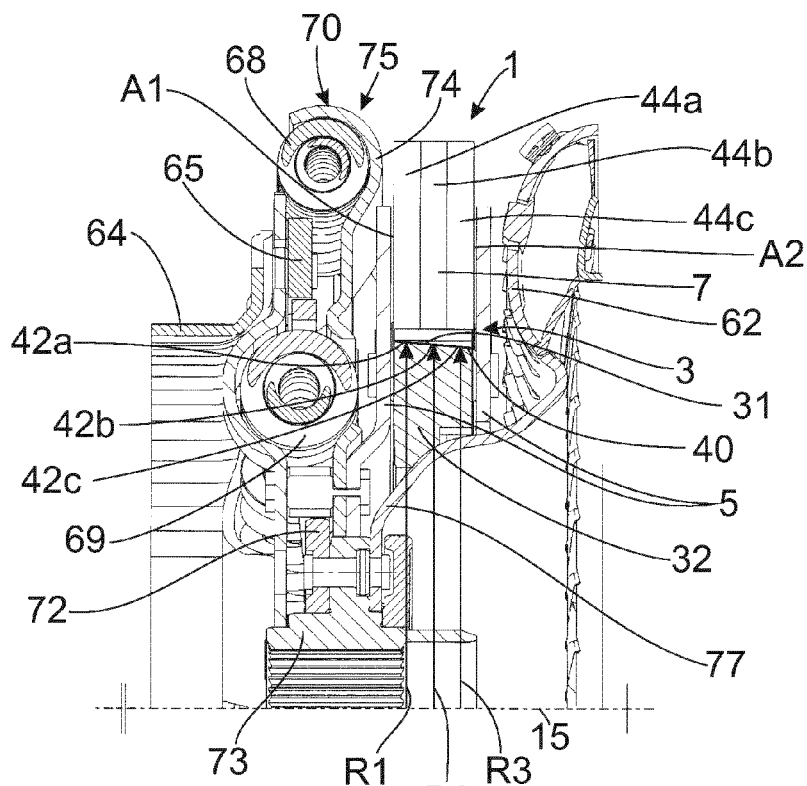
FIG. 10 is a detail of a damping device and of the torsional vibration damper from the coupling arrangement shown in FIG. 9.

FIG. 1 shows a torsional vibration damper 1 with a damper mass carrier 3 that has two axially spaced damper mass support elements 5, of which only the damper mass support element 5 arranged axially behind the damper masses 7 is shown for the sake of a clearer illustration of a plurality of damper masses 7 received at the damper mass carrier 3. The two damper mass support elements 5 are connected to one another by spacers 11. The two damper mass support elements 5 and one of the spacers 11 are also shown in FIG. 5 or FIG. 10, which also contains information pertaining to the damper mass 7. Accordingly, the damper mass 7 has, in axial direction, a plurality of damper mass elements 44a to 44c arranged over rolling bodies 20 inside guideways 22 (see FIG. 2), specifically in such a way that the guideways 22 allow a radial relative movement of the damper mass elements 44a to 44c with respect to the spacers 11. The damper mass elements 44a to 44c have, at their radial inner sides, stop sides 42a, 42b, 42c described more fully.

Guideways 13 are provided in pairs at the damper mass support elements 5 in each instance. These guideways 13 extend in a curved manner, in each instance with an initial region 14 in which the respective guideway 13 has the greatest radial distance from a central axis 15 and with connection regions 17, which extend circumferentially opposite one another so as to adjoin at both sides of the initial region 14. A circumferential end 18 of one of the two connection regions 17 is visible in FIG. 2. Of course, the other connection region 17 also has a circumferential end of this type, but this is not shown in the drawing.

A rolling body 20 is arranged in the guideways 13 in each instance, this rolling body 20 engaging in each instance in an associated guideway 22 of the damper masses 7, these guideways 22 being arranged in pairs in the damper masses 7 in each instance. In the diagram shown in FIG. 1, the damper masses 7 tend radially outward under centrifugal force so that the rolling bodies 20 position themselves in each instance in the initial region 24 of the respective guideway 22, i.e., in that region having the shortest radial distance from the central axis 15. Adjoining the initial region 24 are connection regions 25 that extend circumferentially opposite one another and are bounded in circumferential direction by a circumferential end 26 in each instance.

Each of the damper masses 7 has at the radially inner ends thereof in each instance a geometric shaping 28 having contact curvatures 29 in the circumferentially middle portion, but having a circumferential end curvature 30 in the circumferentially outer portion. In a manner described below, this geometric shaping 28 cooperates with stops 31 provided radially inwardly of the damper masses 7 and at an annular component part 32.

In circumferential direction between every two damper masses 7, the annular component part 32 has a holder 34 that encloses a spacer 11 in each instance such that the holder 34 serves as a stop receiver 35. The annular component part 32 is received at the damper mass support elements 5 and, therefore, at the damper mass carrier 3 to be fixed with respect to relative rotation. An annular body 33 extending in circumferential direction acts between every two stop receivers 35 as a stop 31. Accordingly, all of the stops 31 and all of the stop receivers 35 are brought together at the annular component part 32. Alternatively, other solutions, also not shown, in which each stop 31 or a partial group of stops 31 is received via a stop receiver 35 or a partial group of stop receivers 35 at a supporting component part such as the damper mass carrier 3 are conceivable.

Figures 3, 4:
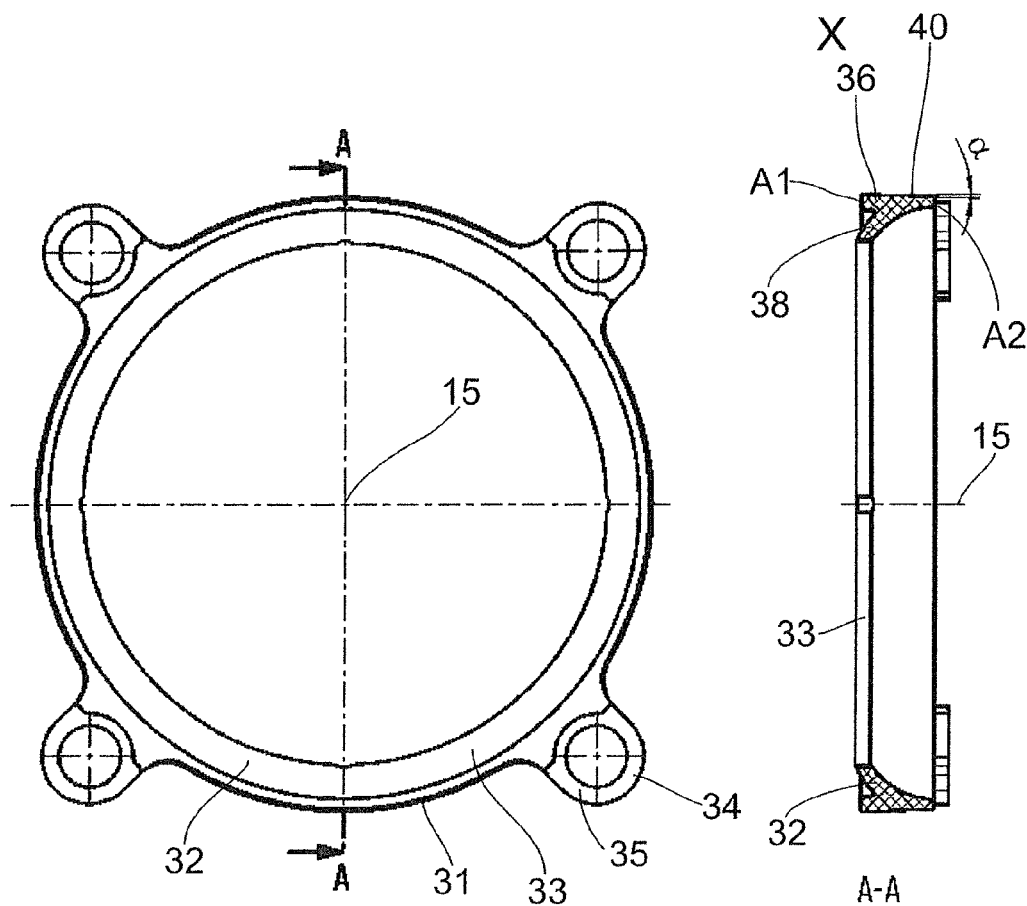
FIG. 3 is a separate illustration of the stop shown in FIG. 1 or FIG. 2.
FIG. 4 is the stop according to section line A-A in FIG. 3.

As shown in the cross sectional view in FIG. 4, the annular component part 32 has an axial flange 36 and a stiffening flange 38 extending with a radial component. The axial flange 36 has at the radially outer side thereof a stop profile 40 that does not extend parallel to the central axis 15 but rather at least substantially narrows in a wedge-shaped manner at an angle a. The annular component part 32 accordingly has, at least at the respective stop 31, a stop profile 40 having a maximum radial distance R1 (see FIG. 5 or FIG. 10) from the central axis 15 at a first axial side A1 of the annular component part 32, for example, at the axially left-hand end in FIG. 4, and a minimum radial distance R3 from the central axis 15 at a second axial side A2 of the annular component part 32, for example, at the axially right-hand end in FIG. 4. However, the radial distance between stop profile 40 and central axis 15 axially between the first axial side A1 and the second axial side A2 takes on values between the radial distances at the two axial sides A1, A2 in terms of amount, for example, the value R2 in the axial extension range of damper mass element 44b.

Starting from the first axial side A1 of the annular component part 32, there is a decreasing radial distance in extension direction of the central axis 15, i.e., in direction toward the second axial side A2 of the annular component part 32. However, this decrease in the radial distances causes an increase in the radial distances between the stop profile 40 of the respective stop 31 and the stop sides 42a, 42b, 42c of the respective damper mass elements 44a to 44c. Consequently, the radial distance between the stop profile 40 and stop side 42a is shortest at the first axial side A1, and the radial distance between the stop profile 40 and stop side 42c is greatest at the second axial side A2. However, the radial distance between stop profile 40 and stop side 42 between the first axial side A1 and the second axial side A2 takes on values between the radial distances at the two axial sides A1, A2 in terms of amount.

While the stop profile 40 in the embodiment shown in FIG. 5 follows an at least substantially continuous course, embodiments, not shown, in which the stop profile 40 in relation to the individual damper mass support elements 5 undergoes a change which takes place in a stepwise manner instead of continuously are also conceivable.

When the torsional vibration damper 1 is operated at a speed at which the centrifugal force exceeds the weight force, the damper masses 7 tend radially outward under centrifugal force so that the rolling body 20 can position itself in the initial region 24 of the respective guideway 22 of the damper masses 7 in each instance. While torsional vibrations can force deflections of the damper masses 7 in circumferential direction so that the rolling bodies 20 are deflected out of the initial regions 24 of the guideways 22 into the connection regions 25 thereof, the rolling bodies 20 are always returned to the initial position under centrifugal force as the torsional vibration decays.

Figure 2:
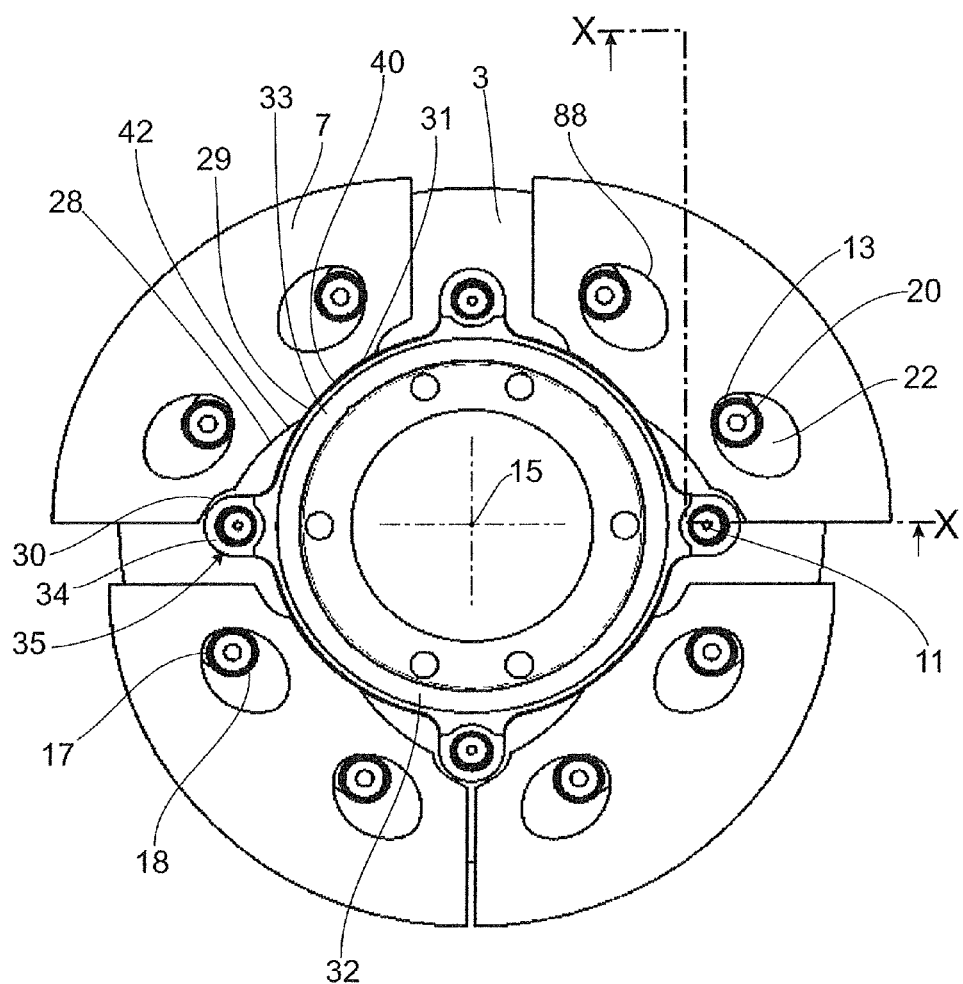
FIG. 2 is a view similar to FIG. 1, but with the damper masses in a position which is occupied when centrifugal force falls below the force of gravity.

However, when the centrifugal force drops below the weight force, for example, in creep mode of a motor vehicle or when stopping a drive, e.g., an internal combustion engine, the damper masses 7 drop radially inward and occupy a relative position, shown in FIG. 2, with respect to one another and to the damper mass carrier 3. In an operating condition of this type, the two damper masses 7 located radially above the central axis 15 drop radially inward until their stop sides 42 have engaged, by the contact curvatures 29 shaped thereon, the associated stop profile 40 of the stop 31 at the annular body 33 of the annular component part 32. If the guideways 22 permit a further movement of the damper masses 7 radially inward, this movement will not end until the circumferential end curvature 30 of the respective damper mass 7 engages the holder 34 and, therefore, the stop receiver 35 of the annular component part 32. The two damper masses 7 located radially below the central axis 15 likewise drop radially inward until their stop sides 42 have engaged, by the contact curvatures 29 shaped thereon, the associated stop profile 40 of the stop 31 at the annular body 33 of the annular component part 32 and until, further, the circumferential end curvature 30 of the respective damper mass 7 engages the holder 34 and, therefore, the stop receiver 35 of the annular component part 32. In this way, the two damper masses 7 located radially below the central axis 15 are prevented from engaging one another by their circumferential end edges.

As a result of forming the stop profile 40 provided at the respective stop 31 with an angle a relative to the central axis 15, the stop sides 42a to 42c of the individual damper mass elements 44a to 44c are oriented relative to the stop profile 40 at different drop heights F1 to F3 (see FIG. 11) in an operating condition in which the centrifugal force exceeds the weight force, as is shown in FIG. 10, and then, when there occurs an operating condition in which the centrifugal force falls below the weight force, strike the stop profile 40 one after the other. The damper mass element 44a having stop side 42a with the shortest drop height F1 to the stop profile 40 is the first damper mass element 44a to engage the stop profile 40 of the stop 31, while the further damper mass elements 44b and 44c strike the stop profile 40 of the stop 31 one after the other in a temporally consecutive manner. Since the individual damper mass element 44a to 44c has only a fraction of the weight of the entire damper mass 7, the impact on the stop 31 takes place with less noise than would be the case for the entire damper mass 7.

Figure 14:
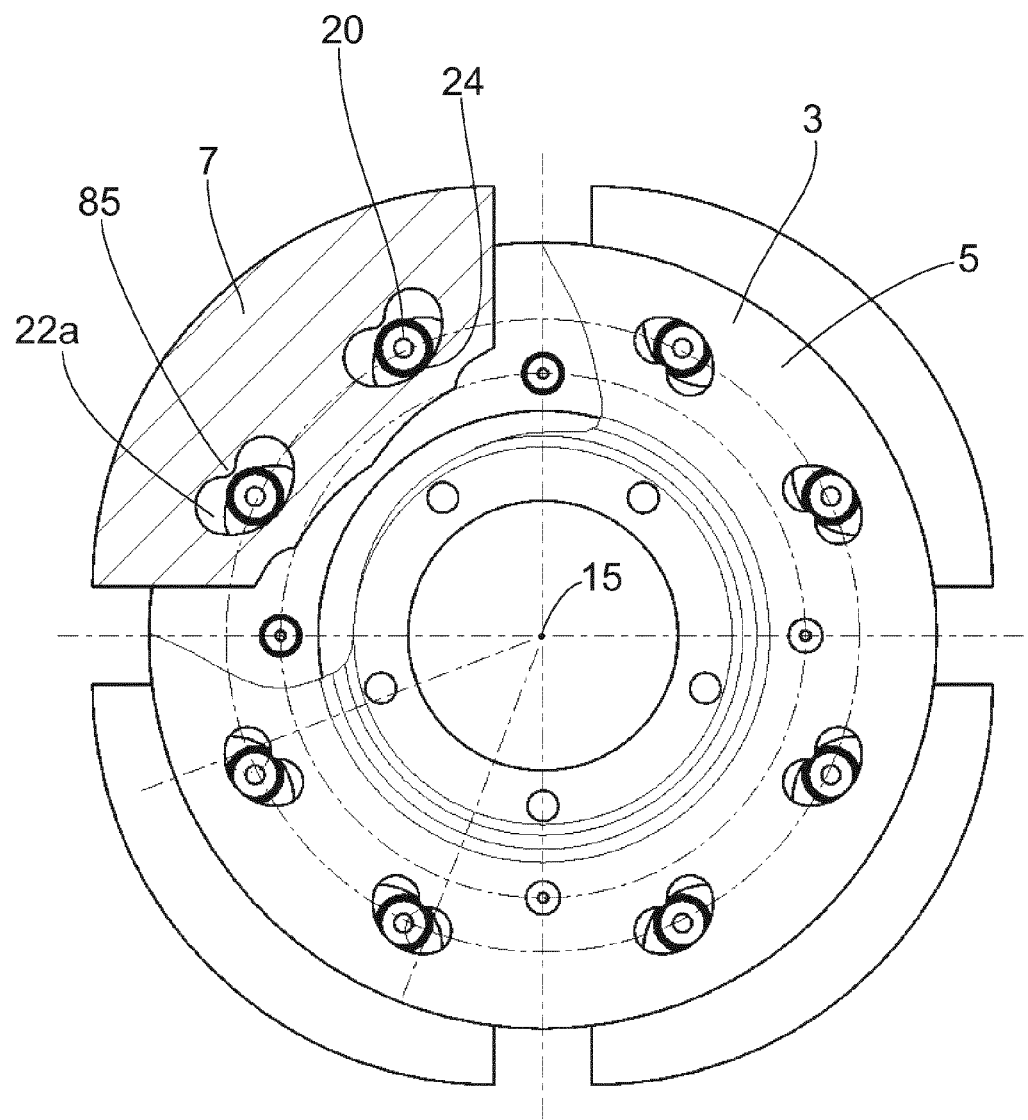
FIG. 14 is a view similar to FIG. 1, but with guideways in the damper masses and in the damper mass carrier corresponding to the prior art for rolling bodies.
Figure 15:
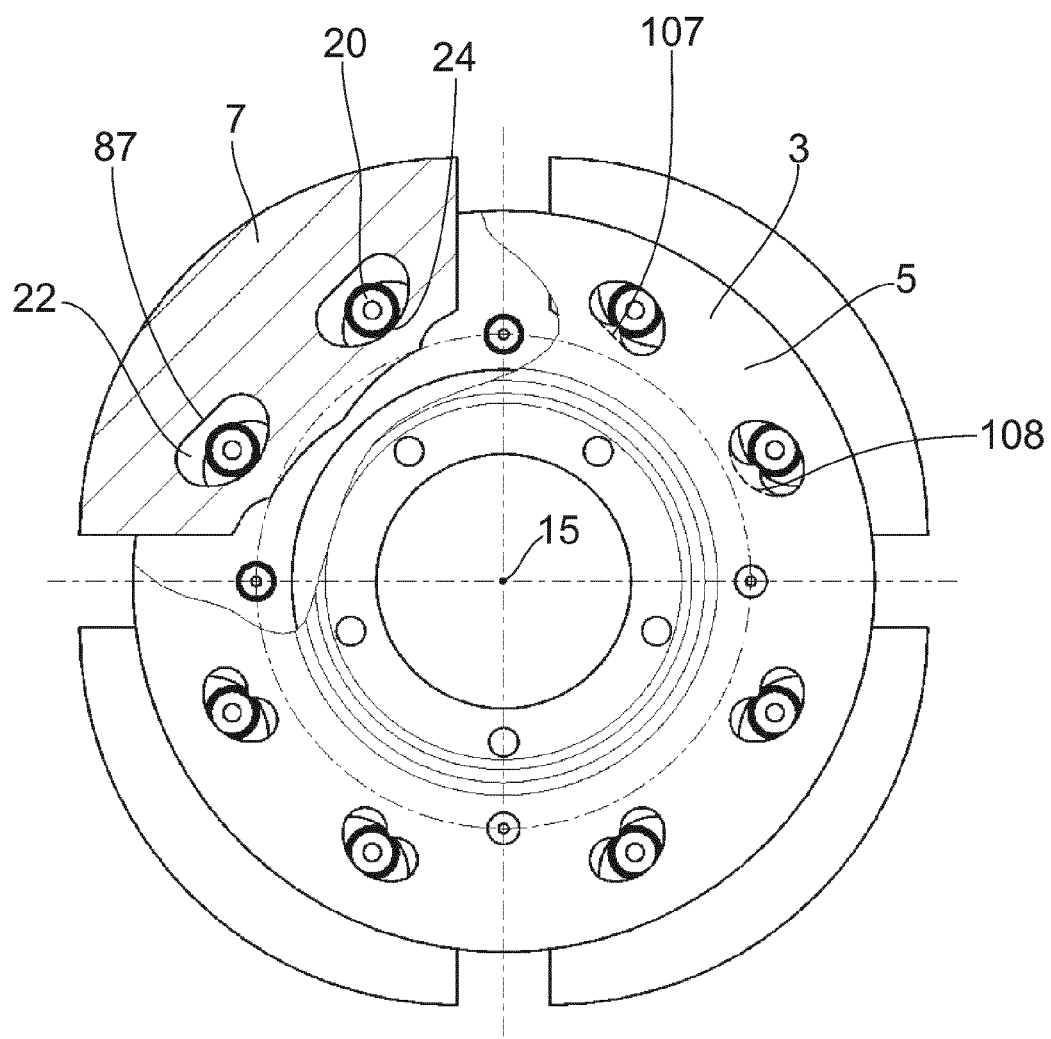
FIG. 15 is a view similar to FIG. 14, but with guideways in the damper masses and in the damper mass carrier which differ from those in FIG. 14.

There is a further step for reducing the noise of impact on the stop 31. This step already follows from FIGS. 1 and 2, but will be discussed in the following referring to FIG. 14 or FIG. 15. While the guideways 22a which are shown in FIG. 14 and which correspond to the prior art have a narrowed portion 85 opposite the respective initial region 24a, the guideways 22 at the comparable location in FIG. 15 are formed at least substantially with a planar shape 87, whereas in FIG. 1 or FIG. 2 they are even formed with a widening 88 in direction away from the initial region 24. The shaping of the guideway 22 with a planar shape 87 or with a widening 88 is advantageous during a change in operating condition, namely, when a centrifugal force that previously exceeded the weight force drops below the weight force owing to a decrease in the operating speed. As has already been described referring to FIG. 2, the damper masses 7 will then drop down through gravitational force. In the embodiment of the guideways 22 according to FIG. 14, the respective rolling body 20 must then roll along this narrowed portion 85 so that a momentum is generated which causes considerable noise when the damper masses 7 drop subsequently. By shaping the guideway 22 with a planar shape 87 or with a widening 88, the damper masses 7 can move along the outer contour of the guideways 22 by the respective rolling bodies 20 substantially without a troublesome momentum and therefore strike the associated stop 31 less noisily. A comparable advantage results when the guideways 13 in the damper mass support elements 5 of the damper mass carrier 3 are also foamed with a planar shape 107 or widening 108, but at the radially inner side in this case. The planar shaping 107 and widening 108 in FIG. 15 are both shown in dashed lines. Of course, in implementing the planar shaping 107 or widening 108, at least some of the guideways 13 are formed in a corresponding manner and not only the one guideway 13 shown in FIG. 15.

Figure 6:
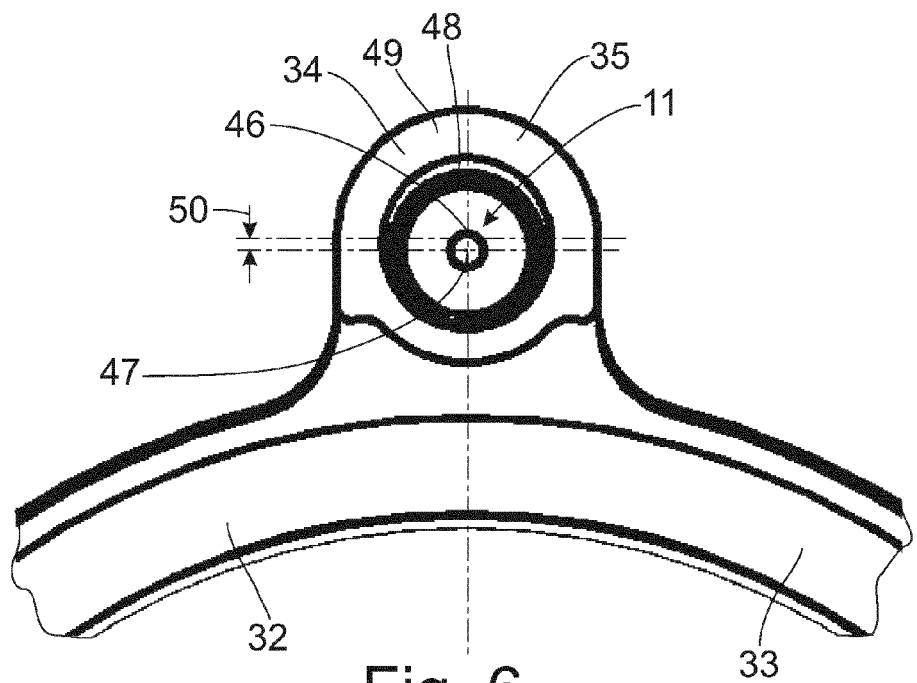
FIG. 6 is a detail of one of the holders of the stop shown in FIG. 3 with radial offset between the holder and a stop receiver enclosed by the latter.

As has already been described, during operating states in which the centrifugal force falls below the weight force, the circumferential end curvature 30 of the respective damper mass element 44a to 44c engages the holder 34 and, therefore, the stop receiver 35 of the annular component part 32. To dampen this impact of the respective damper mass element 44a to 44c, the holder 34, and therefore the stop receiver 35, is formed such that, according to FIG. 6, its center axis 46 is offset from the center axis 47 of the respective stop piece 11 by an axial offset 50. The stop pieces 11 are arranged such that they are located in the radially inner region of the respective holder 34 when the annular component part 32 is affixed. Accordingly, a free space 48 occurs in the holder 34 radially outwardly of the respective stop piece 11 which allows a resiliency of the wall 49 of the holder 34 within the scope of elasticity of this wall 49.

Figures 7, 8:
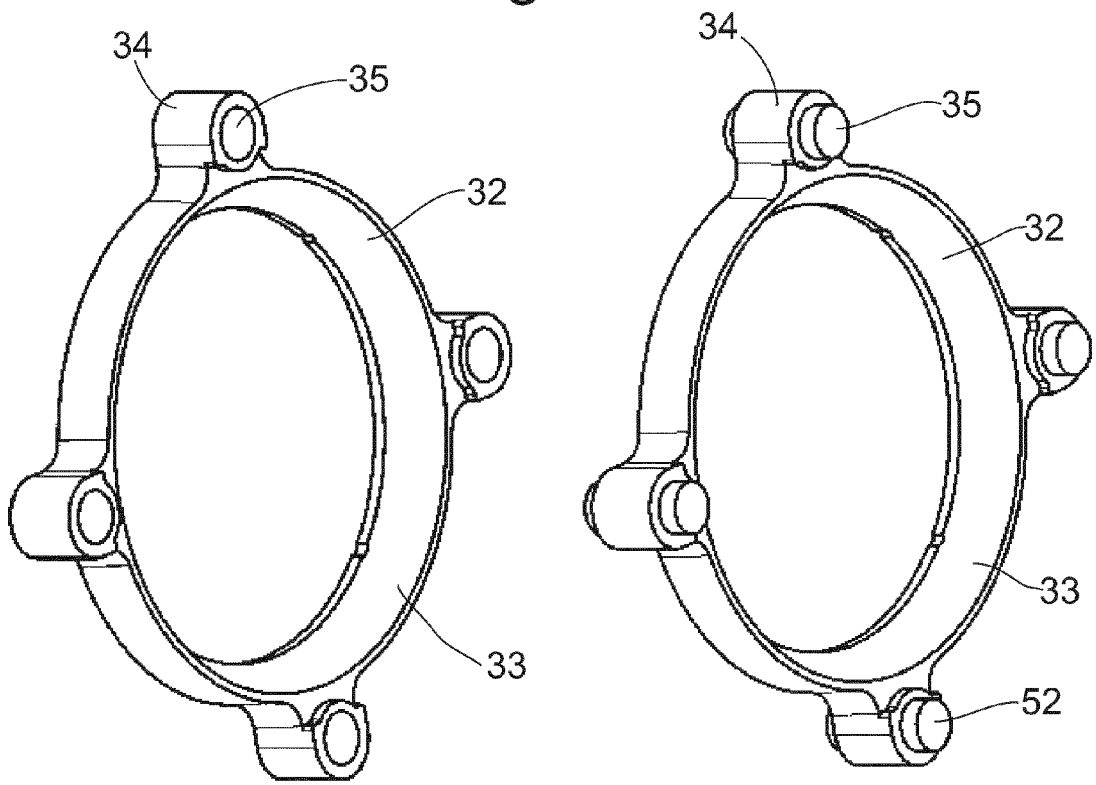

While the annular component part 32, according to FIG. 7, has the configuration of the stop receivers 35, which has been described thus far, namely, with holder 34 intended for receiving the spacers 11, FIG. 8 shows a construction of the stop receivers 35 in which studs 52 are secured in the holders 34 and protrude axially over the holders 34 so as to engage in corresponding recesses of the damper mass support elements 5.

Figure 9:
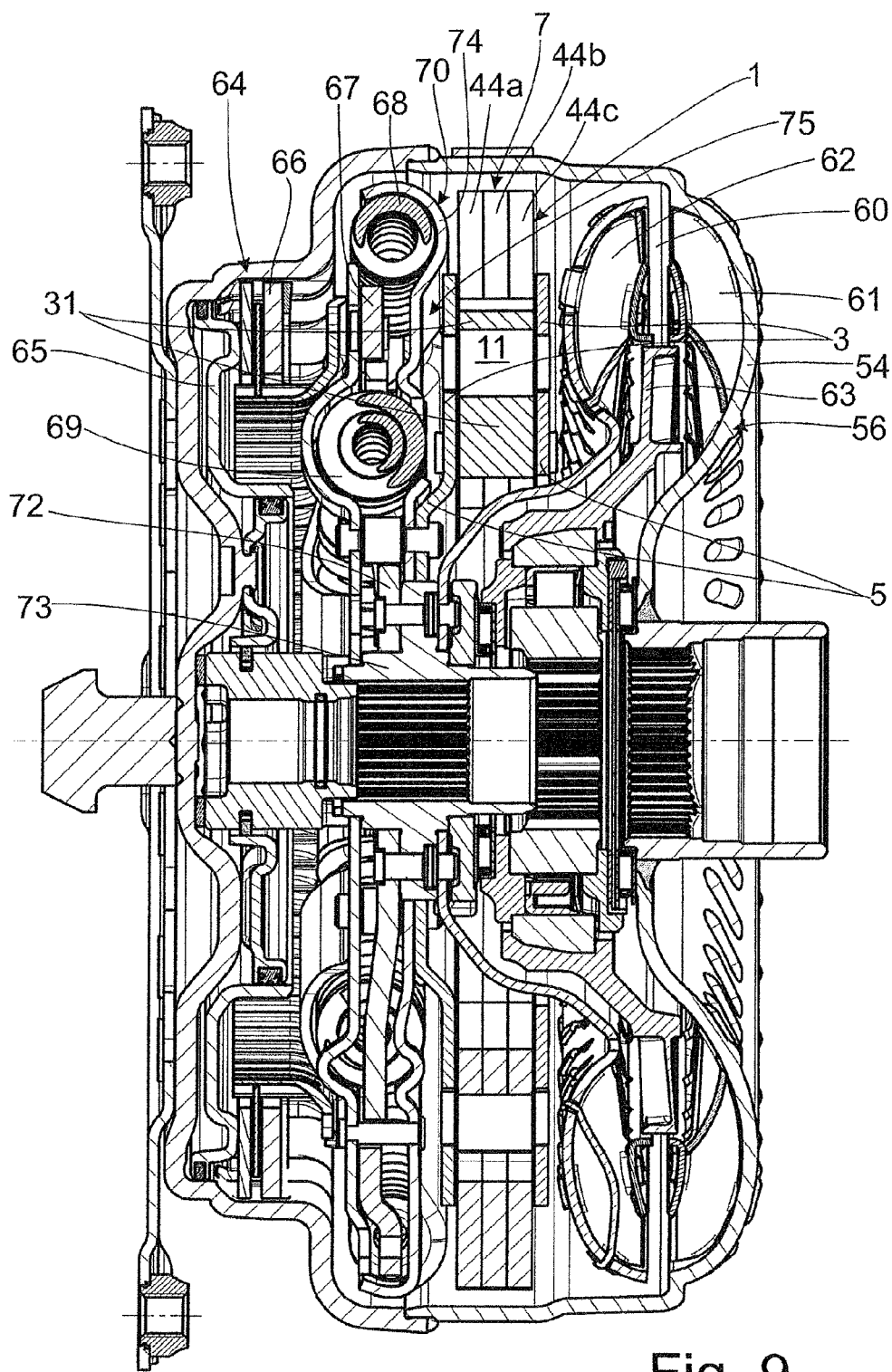
FIG. 9 is a view of the torsional vibration damper in a hydrodynamic coupling arrangement.

According to FIG. 9, the torsional vibration damper 1 is provided in the housing 54 of a hydrodynamic coupling arrangement 56. This hydrodynamic coupling arrangement 56 has a hydrodynamic circuit 60 with impeller 61, turbine 62, stator 63, and a clutch mechanism 64 having a clutch piston 65 and friction disk clutch 66. Depending on the actuation of the clutch piston 65, the clutch mechanism 64 is movable between an engaged position and a disengaged position. The clutch mechanism 64 is connected to a torsion damper input 67 of a damping device 70 having two circumferential spring sets 68, 69, the torsion damper output 72 of the damping device 70 cooperates with an output 73. An intermediate torsion damper component 74 at which a damper mass support element 5 of the damper mass carrier 3 of the torsional vibration damper 1 is received so as to be fixed with respect to relative rotation is operative between the two circumferential spring sets 68, 69. Together with the torsional vibration damper 1, the damping device 70 forms a torsional vibration damper unit 75.

To the extent that the torsional vibration damper 1 is shown, FIG. 9 clearly shows, apart from the two support elements 5 of the damper mass carrier 3, the spacers 11 connecting the latter to one another as well as the damper mass elements 44a to 44c of the damper mass 7. FIG. 10 also shows the same component parts and the annular component part 32 which has the stop profile 40 and which therefore acts as stop 31. As is clearly visible in FIG. 10, the annular component part 32 is located radially inwardly of the damper mass elements 44a to 44c and axially between the damper mass support elements 5. Although the annular component part 32 is received via spacers 11 at the damper mass support elements 5 in the manner already described, it is supported by its radial inner side at a turbine hub 77 attached to output 73.

Figure 11:
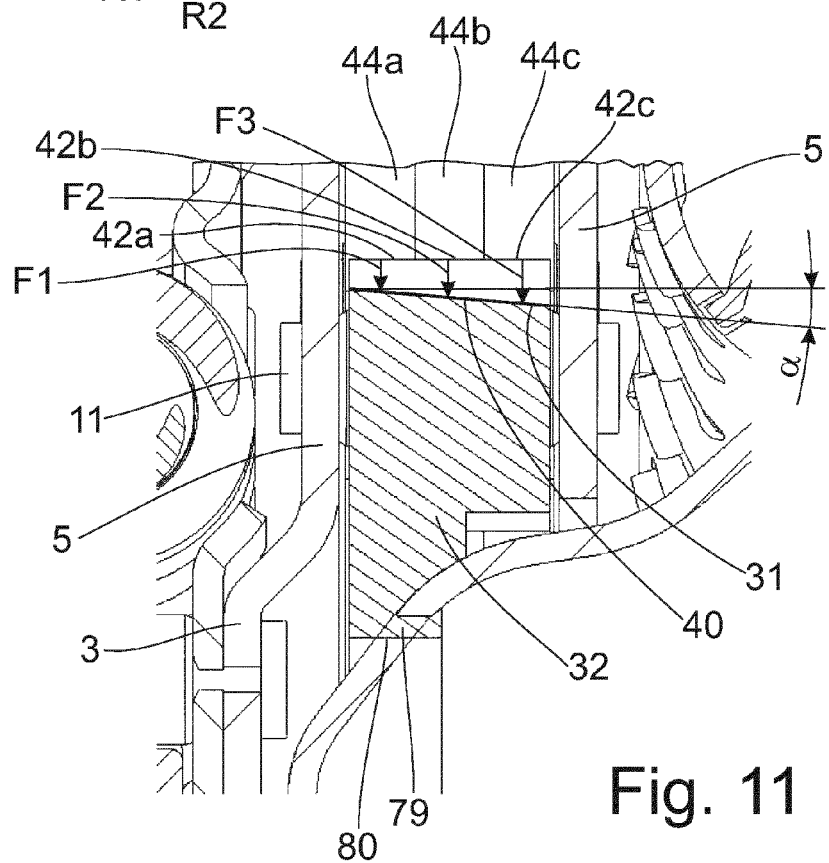
FIG. 11 is a stop with stop receivers which differ from those in the preceding figures and with radial support of the stop at a component part of the coupling arrangement.

While spacers 11 are provided in the embodiment according to FIG. 11, these spacers 11 do not take on any function with respect to the annular component part 32. Instead, the annular component part 32 is supported by its radial inner side at the turbine hub 77 and, via holding projections 79 distributed along the circumference and which extend through respectively associated recesses 80 of the turbine hub 77, is secured to the turbine hub 79 and, therefore, to the turbine 62 in that the holding projections 79 have, at their free ends, latch noses 81 by which they engage behind the turbine hub 79.

Figure 12:
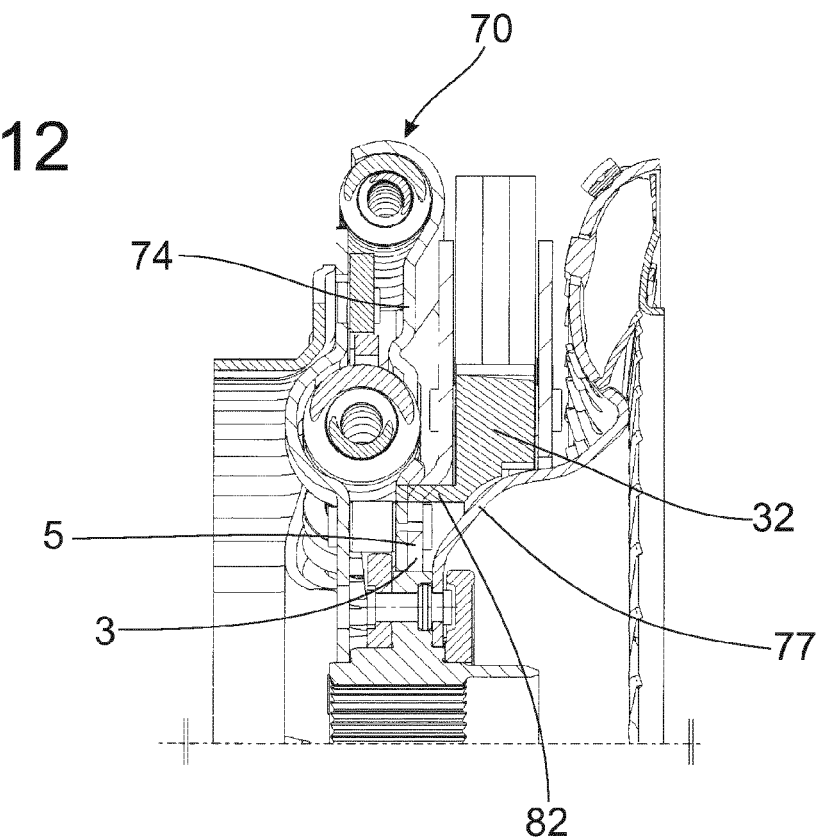
FIG. 12 is a stop with stop receivers which differ from those in FIG. 11 and without radial support of the stop at a component part of the coupling arrangement.
Figure 13:
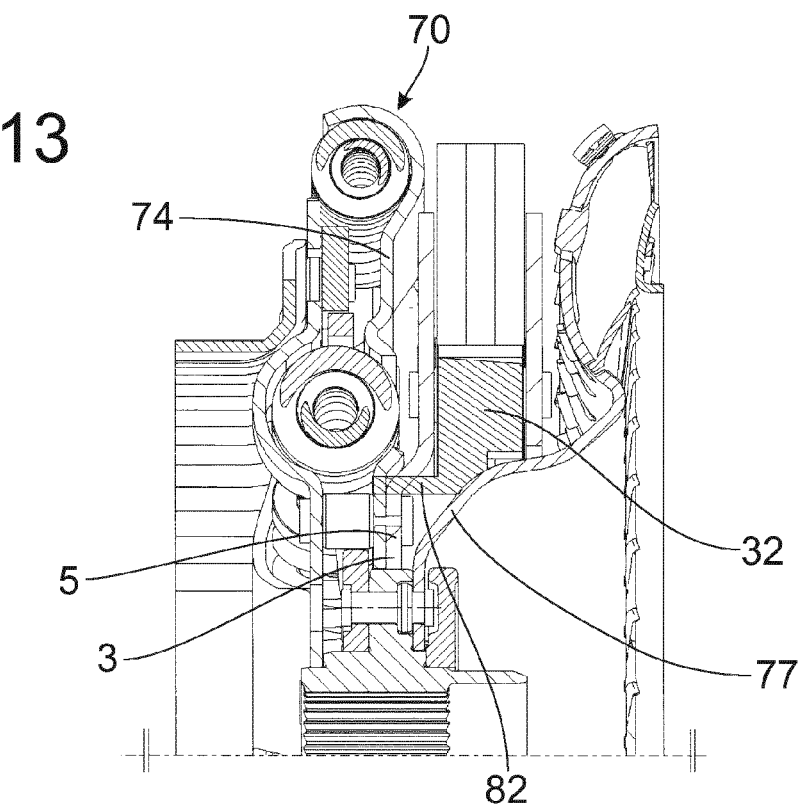
FIG. 13 is a view similar to FIG. 12, but with radial support of the stop at a component part of the coupling arrangement.

Alternatively, according to FIG. 12 or FIG. 13, the annular component part 32 can be secured to the intermediate torsion damper component 74 of the damping device 70 by holding projections 82. To this end, the holding projections 82 engage in corresponding recesses 83 of the damper mass support element 5 adjacent to the intermediate torsion damper component 74 in a manner not shown in more detail. For this purpose, referring to FIG. 13, the annular component part 32 can be supported by its radial inner side at the turbine hub 77, but can also operate independently from the turbine hub 77 referring to FIG. 12.

The holding projections 79 or 82 form alternative constructions of the stop receiver 35 in place of spacer 11 or stud 52.

Figure 16:
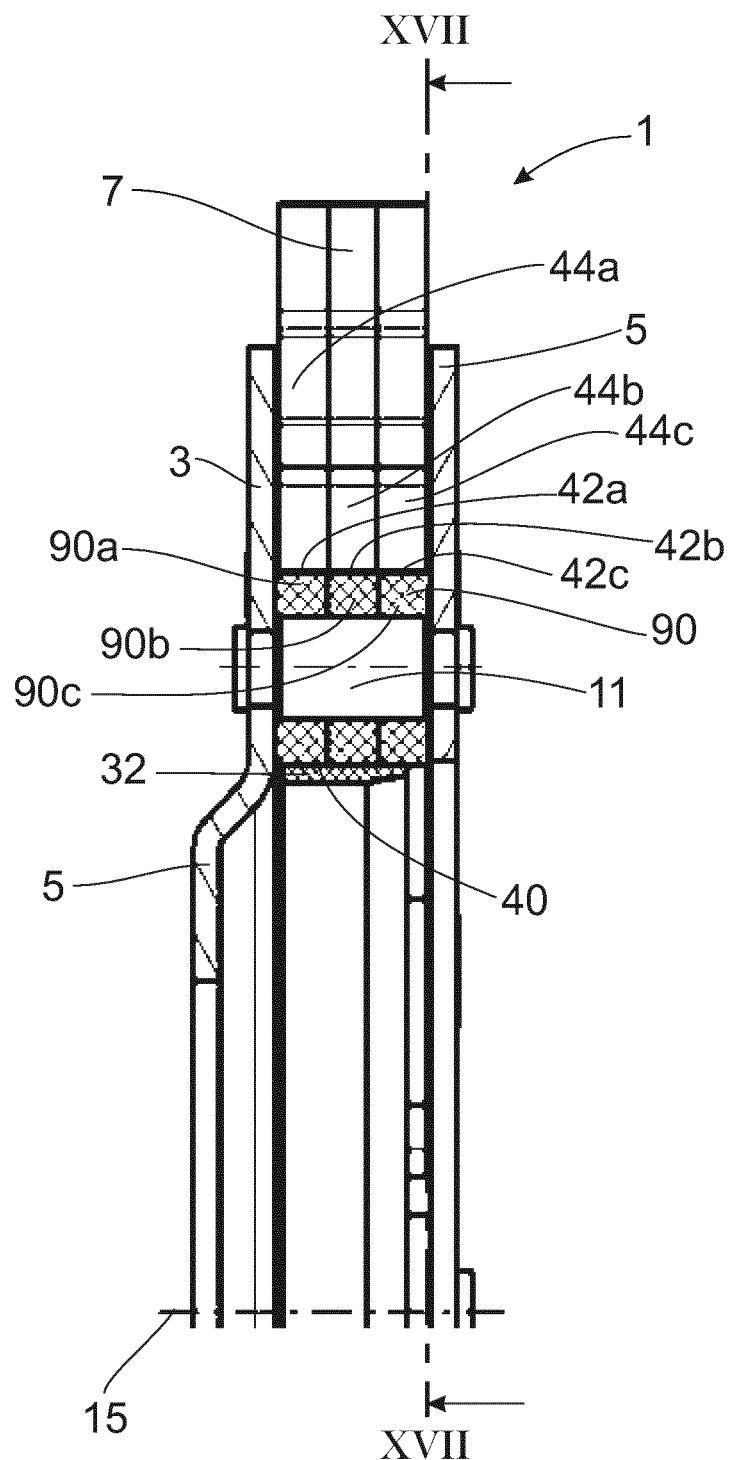
FIG. 16 is a sectional view of a construction of the torsional vibration damper with stops without positive engagement connection to stop receivers.
Figure 17:
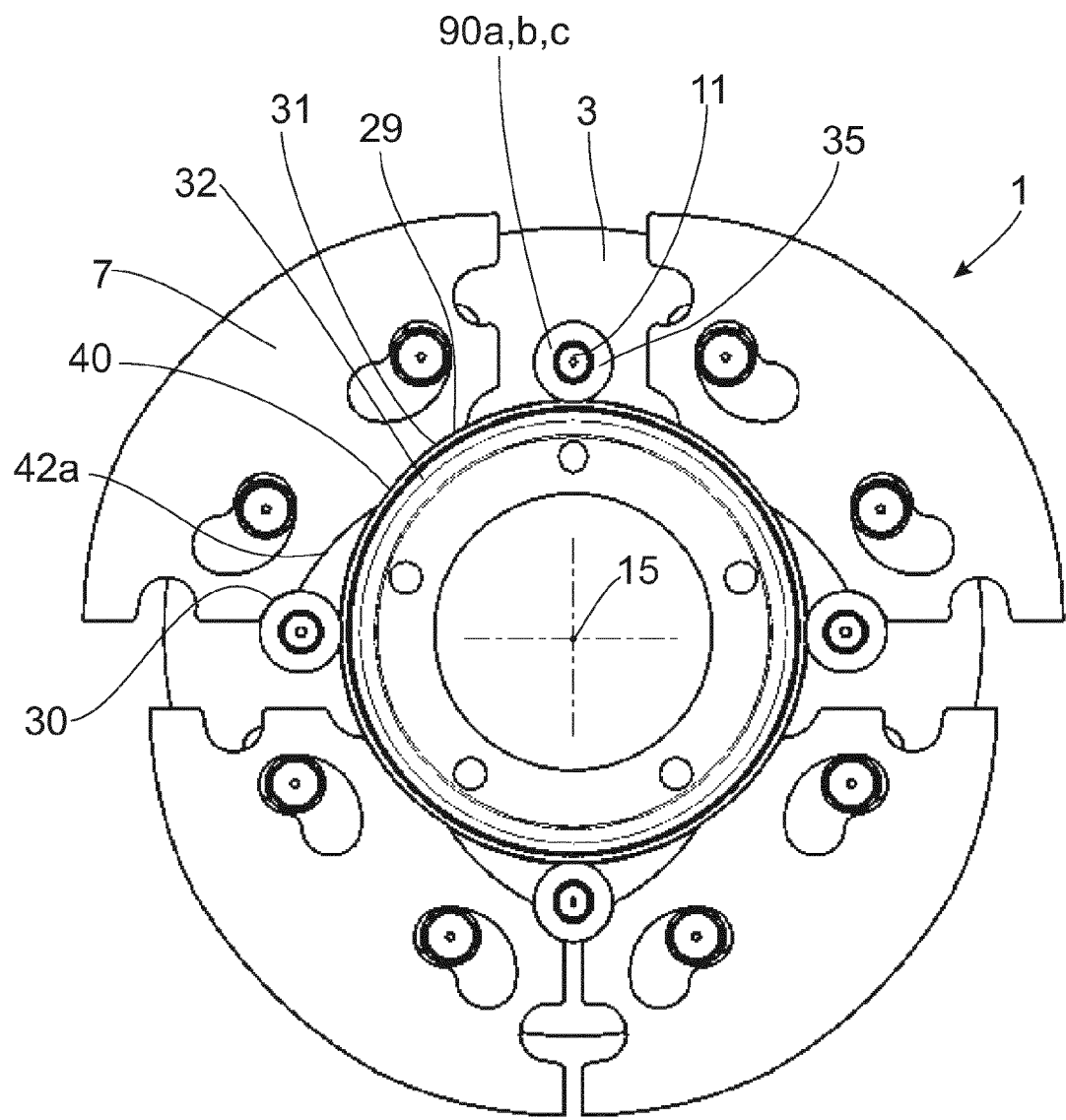
FIG. 17 is a top view from direction XVII-XVII in FIG. 16.

The torsional vibration damper 1 shown in FIGS. 16 and 17 shows the spacers 11 for connecting the damper mass support elements 5 of the damper mass carrier 3. These spacers 11 are either covered with a plurality of annular sheaths 90a, 90b, 90c, each annular sheath 90a to 90c being associated with one damper mass element 44a to 44c, or the spacers 11 are covered with an individual bushing-shaped sheath in each instance, all of the damper mass elements 44a to 44c being associated with the latter. These sheaths 90a to 90c are preferably formed of plastic and are accordingly capable of damping the stop when the respective circumferential end curvature 30 of the stop sides 42a to 42c of the damper mass elements 44a, 44b, 44c moves into operative contact with the sheaths 90a to 90c of the spacers 11. Further, the spacers 11 center the annular component part 32 relative to the central axis 15 so that there are also stops 31 provided at the annular component part 32 that are engaged by the contact curvatures 29 of the stop sides 42a to 42c of the damper mass elements 44a to 44c in operating conditions in which the centrifugal force falls below the weight force. The stops 31 are formed with a stop profile 40 as was described above. With respect to the annular component part 32, the spacers 11 also act as stop receivers 35 in this embodiment but, in contrast to the previous embodiments, do not receive the annular component part 32 in a positive engagement. Instead, the annular component part can be held by the stop receivers 35 in a frictional engagement and therefore so as to experience the same movement as the latter; however, if there is no frictional connection to the stop receivers 35, there can be a relative movement of the annular component part 32 relative to the spacers 11 and, therefore, relative to the damper masses 7. In case of a floating bearing support of the annular component part 32 with respect to the spacers 11, the annular component part 32 can have a greater resiliency and, therefore, improved damping characteristics when the damper mass elements 44a to 44c engage by their stop sides 42a to 42c.

Figure 18:
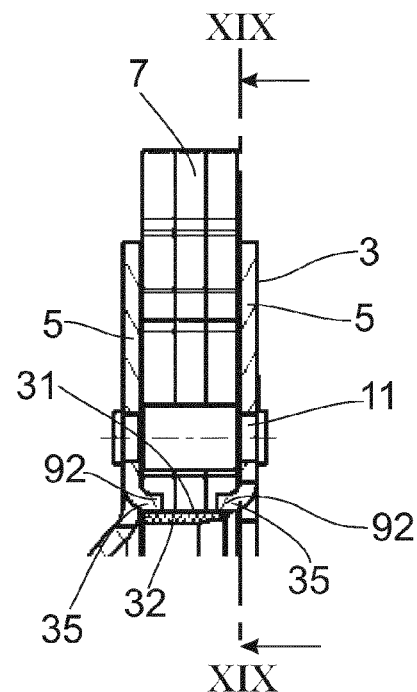
FIG. 18 is a view similar to FIG. 16, but with a different construction of the stop receivers.
Figure 19:
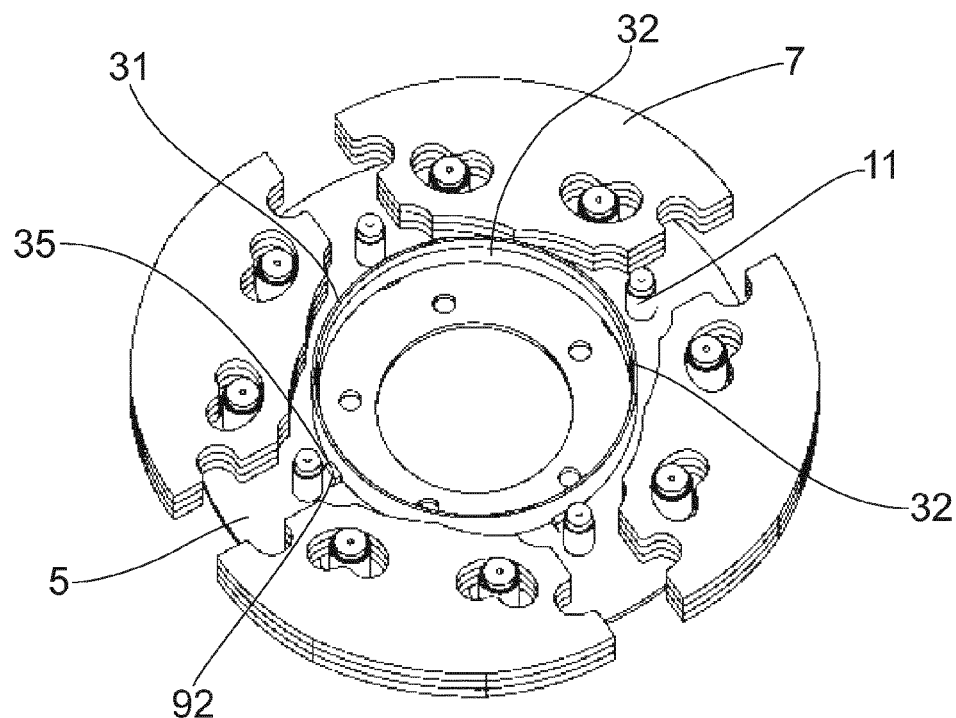
FIG. 19 is a top view from direction XIX-XIX in FIG. 18.
Figure 20:
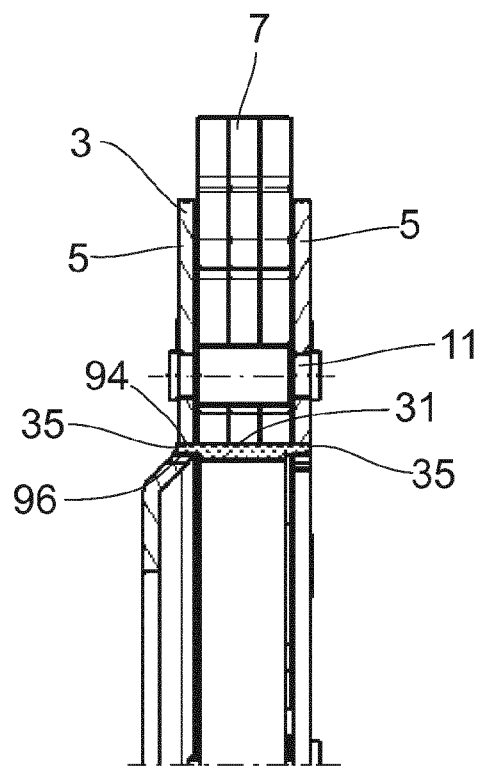
FIG. 20 is a view similar to FIG. 16 with yet another configuration of the stop receivers.
Figure 21:
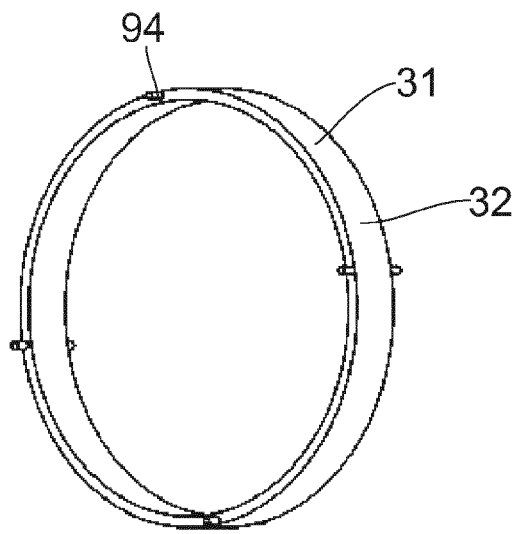
FIG. 21 is a detail of an annular component part with stops.

FIGS. 18, 19, 20 and 21 show alternative embodiments to those in FIGS. 16 and 17. In FIGS. 18 and 19, axial bends 92 are provided at the damper mass support elements 5 of the damper mass carrier 3 preferably in the circumferential region of the spacers 11, but radially inwardly of the latter. Instead of the spacers 11, these axial bends 92 engage around the annular component part 32 to center it. In FIGS. 20 and 21, axial recesses 96 in which axial projections 94 provided at the annular component part engage are provided at the damper mass support elements 5 of the damper mass carrier 3, also preferably in the circumferential region of the spacers 11, but radially inwardly of the latter. In this case, the annular component part 32 is centered by the axial projections. Accordingly, both axial bends 92 and axial projections 94 in combination with the axial recesses 96 act as stop receivers 35 for stops 31 provided at the respective annular component part 32.

Figure 22:
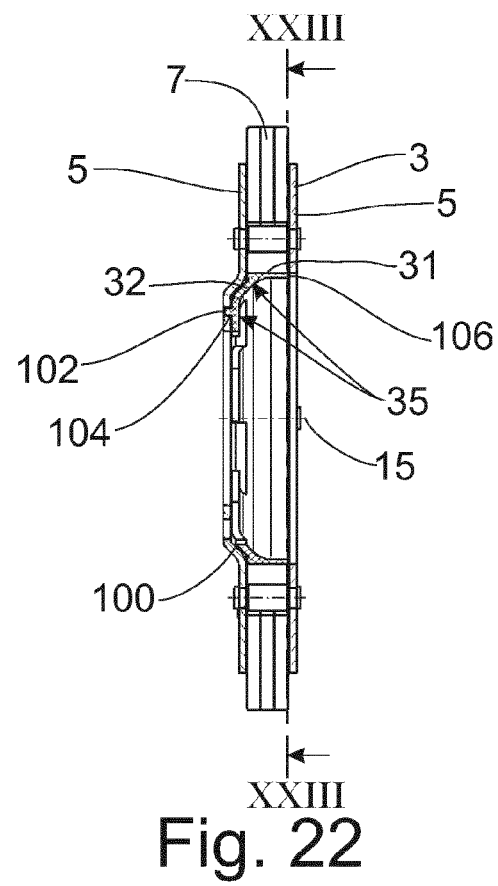
FIG. 22 is a view similar to FIG. 16, but with a different positioning of the stops.
Figure 23:
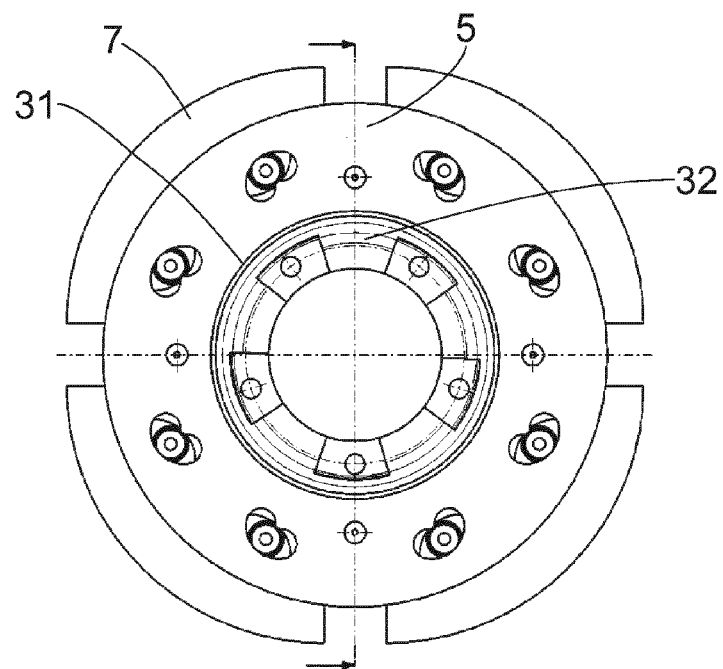
FIG. 23 is a top view from direction XXIII-XXIII in FIG. 22.

FIGS. 22 and 23 show an annular component part 32 which, as can be seen in FIG. 22, is configured in extension direction of the central axis 15 with profiling 100 comparable to the adjacent damper mass support element 5 of the damper mass carrier 3 and is accordingly centered radially with respect to this damper mass support element 5. Alternatively or additionally, the annular component part 32 can have, at its side facing the adjacent damper mass support element 5, axial projections 102 that engage in corresponding recesses 104 of the damper mass support element 5 and accordingly prevent a radial movement relative to the damper mass support element 5. Accordingly, the profiling 100 and/or axial projections 102 act in combination with the recesses 104 as stop receivers 35 for stops 31 provided at the respective annular component part 32.

The annular component part 32 is axially supported by its axially free end 106 at the corresponding damper mass support element 5 to benefit an axial positioning of the annular component part 32 in relation to the damper mass carrier 3.

According to one aspect of the invention, the first damper mass element 44a is provided at a first axial side A1 of the damper mass 7, the second damper mass element 44c is provided at a second axial side A2 of the damper mass, and the at least one further damper mass element 44b is provided axially between the first damper mass element 44a and the second damper mass element 44c.

According to one aspect of the invention, the stops 31 are fixed in circumferential direction between every two damper masses 7 when there is a plurality of stops 31 for the damper masses 7.

According to one aspect of the invention, the stops 31 for the damper masses 7 are fixed by elements of at least one stop receiver 35.

According to one aspect of the invention, the at least one stop 31 extends at least within the region between the associated stop receiver 35 and the damper masses 7 provided at both sides of this stop receiver 35.

According to one aspect of the invention, the at least one stop 31 for the damper mass 7 is displaceable in circumferential direction relative to the damper mass 7.

According to one aspect of the invention, at least one stop receiver 35 is associated with the at least one stop 31 for the damper mass 7, which at least one stop receiver 35 causes a centering of the stop 31 relative to the central axis 15.

According to one aspect of the invention, the stop sides 42a to 42c of the damper mass elements 44a to 44c are adapted with respect to their geometry to the shape of the stop profile 40 of the stop 31.

According to one aspect of the invention, for a plurality of damper masses 7, the stops 31 are collectively arranged at a common, preferably annular, component part 32.

According to one aspect of the invention, the stops 31 for the damper masses 7 are secured to, or at least centered at, the damper mass carrier 3, a component part 74 of a damping device 70 of the coupling arrangement 56, or a component part 62 of the coupling arrangement 56.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torsional vibration damper comprising
    a damper mass carrier;
    at least one damper mass movably received at the damper mass carrier relative to the damper mass carrier;
    at least one stop associated with each stop side of the at least one damper mass,
    wherein the at least one damper mass and the stop have an extension in a direction of a central axis,
    a plurality of damper mass elements associated with the at least one damper mass arranged in the direction of the central axis,
    wherein the stop has in the direction of the central axis a stop profile at its side facing the stop sides of the damper mass elements,
    the stop profile having different radial distances from the central axis in association with each of the damper mass elements,
    a coupling arrangement, wherein the coupling arrangement has a torsional vibration damper unit in which the damping device having at least one circumferential spring set has a torsion damper input and a torsion damper output,
    wherein at least one of the torsion damper input, the torsion damper output, and an intermediate torsion damper component located between the torsion damper input and the torsion damper output is provided for receiving at least one damper mass support element of the damper mass carrier to be fixed with respect to relative rotation.

2. The torsional vibration damper according to claim 1, wherein
the stop profile has a maximum radial distance from the central axis in association with a first damper mass element, a minimum radial distance in association with a second damper mass element, and a radial distance in association with at least one further damper mass element,
wherein a magnitude of the radial distance lies between the maximum radial distance and the minimum radial distance.

3. The torsional vibration damper according to claim 2, wherein
the first damper mass element is provided at a first axial side of the damper mass,
the second damper mass element is provided at a second axial side of the damper mass, and
the at least one further damper mass element is provided axially between the first damper mass element and the second damper mass element.

4. The torsional vibration damper according to claim 3, wherein a change in radial distance between the stop profile of the stop and the central axis follows an at least substantially continuous course between the first axial side of the damper mass and the second axial side of the damper mass.

5. The torsional vibration damper according to claim 4, wherein, starting from the first axial side of the damper mass, the stop profile of the stop narrows in a wedge shape at an angle in direction of the second axial side of the damper mass.

6. The torsional vibration damper according to claim 1, wherein the stops are fixed in circumferential direction between every two damper masses.

7. The torsional vibration damper according to claim 6, wherein the stops for the damper mass are fixed by at least one stop receiver.

8. The torsional vibration damper according to claim 7, wherein the at least one stop extends at least within a region between the associated stop receiver and the damper mass provided at both sides of this stop receiver.

9. The torsional vibration damper according to claim 8, wherein the stop in association with the respective stop receiver is provided with at least one holder that encloses the stop receiver.

10. The torsional vibration damper according to claim 9, wherein the at least one holder is configured to form a free space with an axial offset relative to the associated stop receiver.

11. The torsional vibration damper according to claim 7, wherein the at least one stop receiver for the stops is formed by at least one holding projection which, after engaging through one of a first associated recess and through engagement in a second associated recess of a component part of a coupling arrangement, is fixedly held through the component part.

12. The torsional vibration damper according to claim 1, wherein the at least one stop for the damper mass is displaceable in circumferential direction relative to the damper mass.

13. The torsional vibration damper according to claim 12, wherein at least one stop receiver is associated with the at least one stop for the damper mass, the at least one stop receiver configured to center the stop relative to the central axis.

14. The torsional vibration damper according to claim 13, wherein a sheath is associated with the at least one stop receiver.

15. The torsional vibration damper according to claim 1, wherein the stop is supported by its radially inner side at a component part of a coupling arrangement.

16. The torsional vibration damper according to claim 15, wherein respective stops for respective damper masses are at least one of secured to and least centered at, one of the damper mass carrier, a component part of a damping device of the coupling arrangement, and a component part of the coupling arrangement.

17. The torsional vibration damper according to claim 1, wherein the stop sides of the damper mass elements are adapted with respect to their geometry to a shape of the stop profile of the stop.

18. The torsional vibration damper according to claim 1,
wherein the damper mass carrier, with respect to every damper mass, has two first guideways that cooperate with two second guideways of the respective damper mass,
wherein rolling bodies configured to receive the damper masses at the damper mass carrier allow relative movement thereof and connect the two first guideways and the two second guideways to one another,
wherein at least one of the two second guideways have in a radially outer region one of a planar shaping and a widening and the two first guideways have in a radially inner region one of a planar shaping and a widening so that a radial extension of the respective guideway takes on a maximum in a circumferential region of a respective initial region.

19. The torsional vibration damper according to claim 1, wherein, for a plurality of damper masses, the stops are collectively arranged at a common, annular, component part.

20. The torsional vibration damper according to claim 1, wherein the stops for the damper masses are arranged radially inwardly of the damper masses.

21. The torsional vibration damper according to claim 1, wherein the torsional vibration damper unit cooperates with a clutch mechanism.

* * * * *